United States Patent
Chubb et al.

(10) Patent No.: US 7,051,634 B1
(45) Date of Patent: May 30, 2006

(54) SHEET MATERIAL SAW TABLE

(75) Inventors: Arthur Bryant Chubb, Dexter, MI (US); James E. Suyak, Dexter, MI (US); Norman Chubb, Carlton, MI (US); Arthur Bryant Chubb, II, Pinckney, MI (US)

(73) Assignee: J-Dan, Inc., Romulus, MI (US)

( * ) Notice: Subject to any disclaimer, the term of this patent is extended or adjusted under 35 U.S.C. 154(b) by 331 days.

(21) Appl. No.: 10/283,628

(22) Filed: Oct. 30, 2002

(51) Int. Cl.
*B27B 5/20* (2006.01)

(52) U.S. Cl. .................. 83/486.1; 83/574; 83/581; 83/522.18; 83/522.25

(58) Field of Classification Search ............... 83/486.1, 83/471.2, 471.3, 522.18, 522.19, 522.25, 83/574, 581; 144/379, 135.3, 135.4; 408/237
See application file for complete search history.

(56) References Cited

U.S. PATENT DOCUMENTS

| | | | | |
|---|---|---|---|---|
| 1,756,121 A | * | 4/1930 | Hedgpeth ..................... 83/574 |
| 2,366,512 A | * | 1/1945 | Gardner ..................... 83/486.1 |
| 2,835,285 A | * | 5/1958 | Gardner ..................... 83/486.1 |
| 3,023,792 A | * | 3/1962 | Palmer et al. ............. 83/486.1 |
| 3,092,154 A | * | 6/1963 | Dobslaw ..................... 83/486.1 |
| 3,139,124 A | * | 6/1964 | Hoff ....................... 83/486.1 X |
| 3,294,129 A | * | 12/1966 | Kohler et al. ............. 83/486.1 |
| 3,565,135 A | * | 2/1971 | Rosenthal et al. ......... 83/471.3 |
| 3,955,456 A | | 5/1976 | Van Cleave ............... 83/471.3 |
| 4,784,192 A | * | 11/1988 | Raggiotti ............... 83/471.3 X |
| 5,421,231 A | | 6/1995 | Break et al. ............... 83/471.3 |
| 5,868,054 A | | 2/1999 | Chubb et al. ............ 83/522.18 |

* cited by examiner

*Primary Examiner*—Clark F. Dexter
(74) *Attorney, Agent, or Firm*—Reising, Ethington, Barnes, Kisselle, P.C.

(57) ABSTRACT

A saw table for sheet material includes a platform having an abutment stop along one edge for engaging and locating sheet material supported on the platform. A mast is disposed adjacent to the platform edge for rotation about an axis perpendicular to the platform. A boom extends from the mast over the platform, and has an elongated track perpendicular to the axis of the mast. A carriage is carried by the boom for movement along the track. The carriage is adapted for mounting a saw, such as a circular saw, such that movement of the carriage along the track brings the saw into engagement with sheet material supported on the platform against the abutment stop.

17 Claims, 4 Drawing Sheets

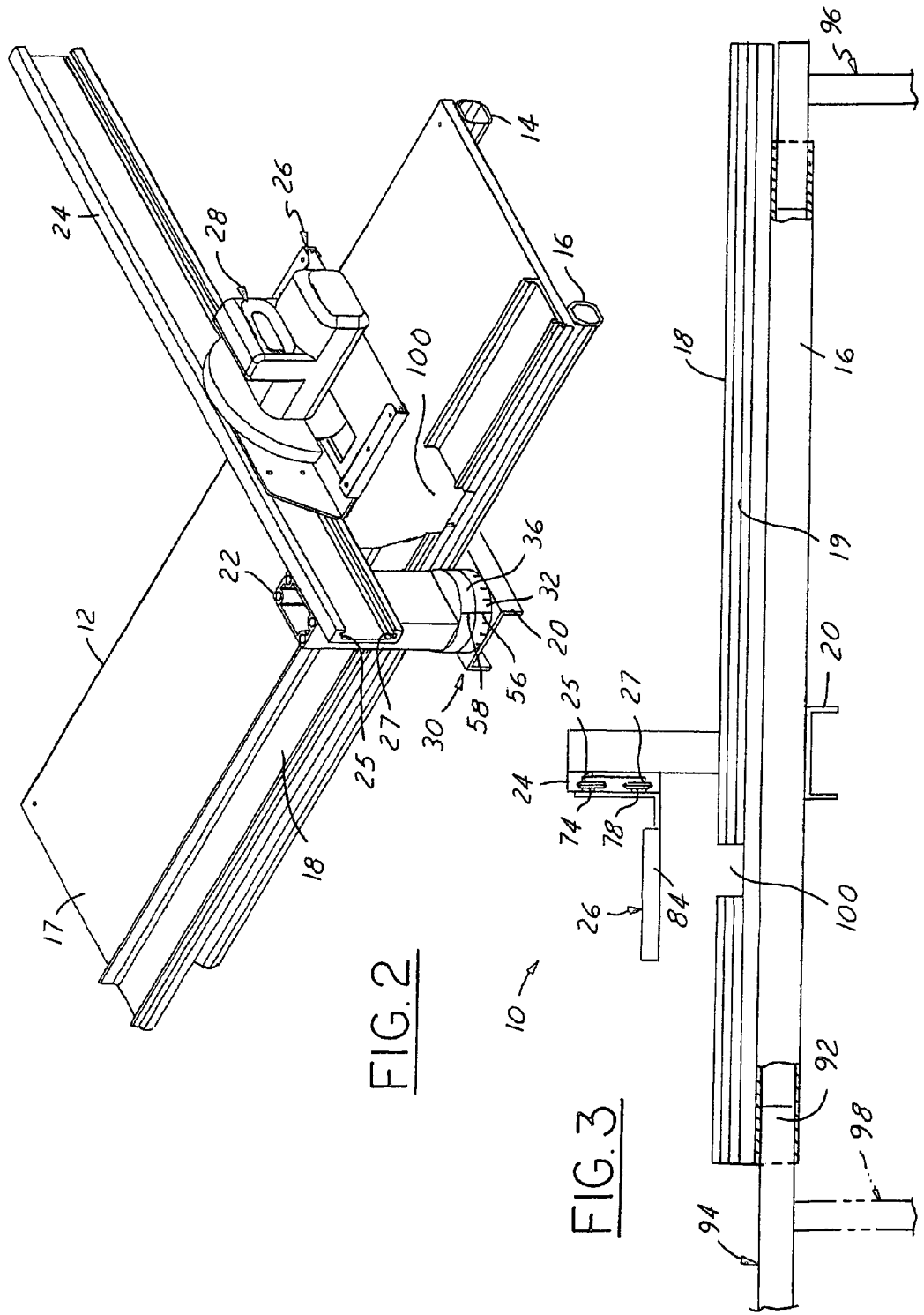

SHEET MATERIAL SAW TABLE

The present invention is directed to saw tables for cutting sheet material such as aluminum and vinyl house trim.

BACKGROUND AND SUMMARY OF THE INVENTION

Saw tables of the subject type are portable, and are transported by housing trim professionals, for example, to a job site. It is an object of the present to provide a saw table that is light weight and designed easily to be used in the field.

A saw table for sheet material in accordance with one aspect of the present invention includes a platform having an abutment stop along one edge for engaging and locating sheet material supported on the platform. A mast is disposed adjacent to the platform edge for rotation about an axis perpendicular to the platform. A boom extends from the mast over the platform, and has an elongated track perpendicular to the axis of the mast. A carriage is carried by the boom for movement along the track. The carriage is adapted for mounting a saw, such as a circular saw, such that movement of the carriage along the track brings the saw into engagement with sheet material supported on the platform against the abutment stop.

BRIEF DESCRIPTION OF THE DRAWING

The invention, together with additional objects, features and advantages thereof, will be best understood from the following description, the appended claims and the accompanying drawings in which:

FIG. 2 is a rear perspective view of the saw table illustrated in FIG. 1;

FIG. 3 is a partially sectioned front elevational view of the saw table in FIGS. 1 and 2;

DETAILED DESCRIPTION OF PREFERRED EMBODIMENTS

FIGS. 1–4 illustrate a saw table 10 in accordance with one presently preferred embodiment of the invention as comprising a platform 12 mounted on a pair of spaced support rails 14, 16. Platform 12 preferably is of flat rectangular construction with a planar upper surface 17 and an elongated abutment stop 18 extending along a long back edge of the platform. The opposing front edge of platform 12 is free of obstruction, so that sheet material may be inserted from the front of the platform, rather than from the end of the platform as is typical in the prior art. Platform 12 may be of wood or plastic construction, such as PVC.

Figure 4:
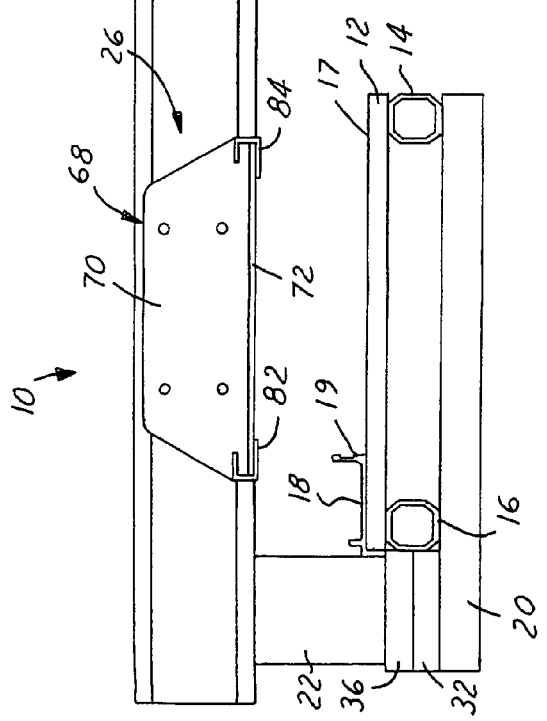
FIG. 4 is a side elevational view of the saw table of FIGS. 1–3.

A support beam or plate 20 underlies platform 12, and is securely fastened to the undersides of rails 14, 16, extending outwardly from rail 16 at the rear of the platform (FIGS. 2 and 4). A mast 22 is mounted on plate 20, by means to be described, for rotation about an axis perpendicular to the plane of platform surface 17. A boom 24 is cantilevered from the upper end of mast 22 and extends over table platform 12 parallel to surface 17. Boom 24 is of C-shaped cross section, having opposed vertically spaced coplanar channels 25, 27 that form an elongated track on the boom. A saw carriage 26 is mounted on boom 24 for longitudinal movement in the track so formed on the boom. A saw 28, such as a circular saw, is secured to carriage 26, such that movement of the saw and carriage along the track of boom 24 brings the blade of the saw into engagement with sheet material on platform 12. Boom 24, mast 22, plate 20, abutment stop 18 and rails 14, 16 preferably are of extruded metallic construction such as aluminum.

Figure 1:
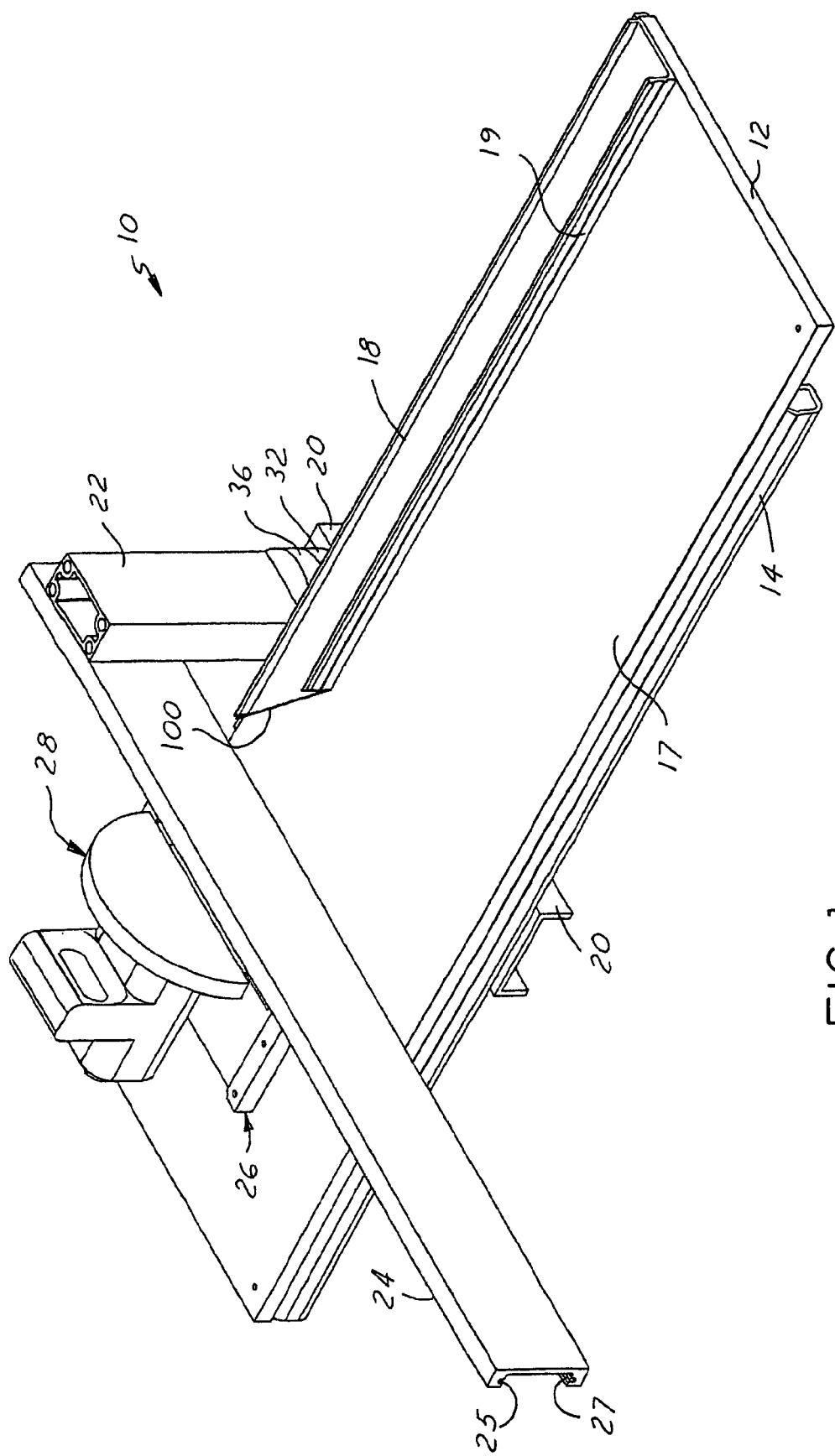
FIG. 1 is a front perspective view of a saw table in accordance with one presently preferred embodiment of the invention.
Figure 5:
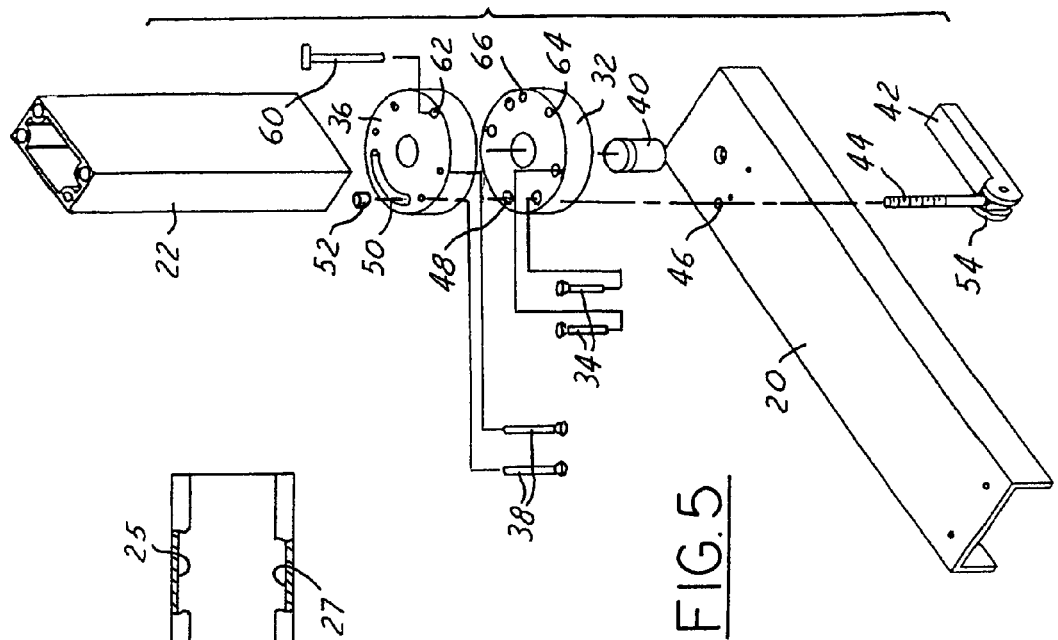
FIG. 5 is an exploded perspective view of the rotatable mast in the saw table of FIGS. 1–5.

Mast 22 is secured to support plate 20, externally adjacent to abutment stop 18 on platform 12, by means of the rotatable lock arrangement 30 illustrated in FIGS. 2 and 4–5. A first or lower disk 32 is secured to plate 20 by means of screws 34. A second or upper disk 36 is secured to the lower end of mast 22 by means of screws 38. Disks 32, 36 have aligned central openings that are received over a pivot pin 40 secured to plate 20, the opposed surfaces of disks 32, 36 being in sliding engagement during rotation of the mast. Thus, mast 22 and disk 36 are rotatable about pin 40 with respect to disk 32 and support plate 20. A cam arm 42 is pivotally connected to a threaded shank 44 that extends upwardly through an opening 46 in support plate 20, an opening 48 in disk 32 and an opening 50 in disk 36 into engagement with a nut 52 disposed within mast 22. Opening 50 in disk 36 is arcuate to accommodate rotation of disk 36 and mast 22 about the axis of pivot pin 40. With cam arm 42 oriented downwardly, tension is relieved in shank 44 so that mast 22 and disk 36 are freely rotatable about the axis of pivot pin 40. When cam arm 42 is pivoted to the horizontal position illustrated in FIG. 5, the nose 54 on the cam arm pulls shank 44 downwardly, clamping disk 36 firmly against disk 32 and thereby preventing further rotation of disk 36 and mast 22. Disks 32, 36 preferably have peripheral indicia 56, 58 that cooperate in assembly to indicate the angular orientation of mast 22 and boom 24. Such indicia may be in units of degrees, and/or in units of roof slope inasmuch as a major use of the saw table is to cut aluminum or vinyl trim for roof facia. The lock and alignment indicia of the present invention preferably are supplemented by a pin lock arrangement for fixed angular orientations of mast 22 and boom 24, such as 90° and 45° with respect to the front or material-engaging face 19 of abutment stop 18. Such pin lock arrangement is provided by a lock pin 60 in cooperation with an aperture 62 in disk 36 and a pair of apertures 64, 66 in disk 32. At 90° orientation of mast 22 and boom 24, pin 60 may be inserted through aligned apertures 62, 64. At a 45° orientation, pin 60 may be inserted through aligned apertures 62, 66.

Figure 6:
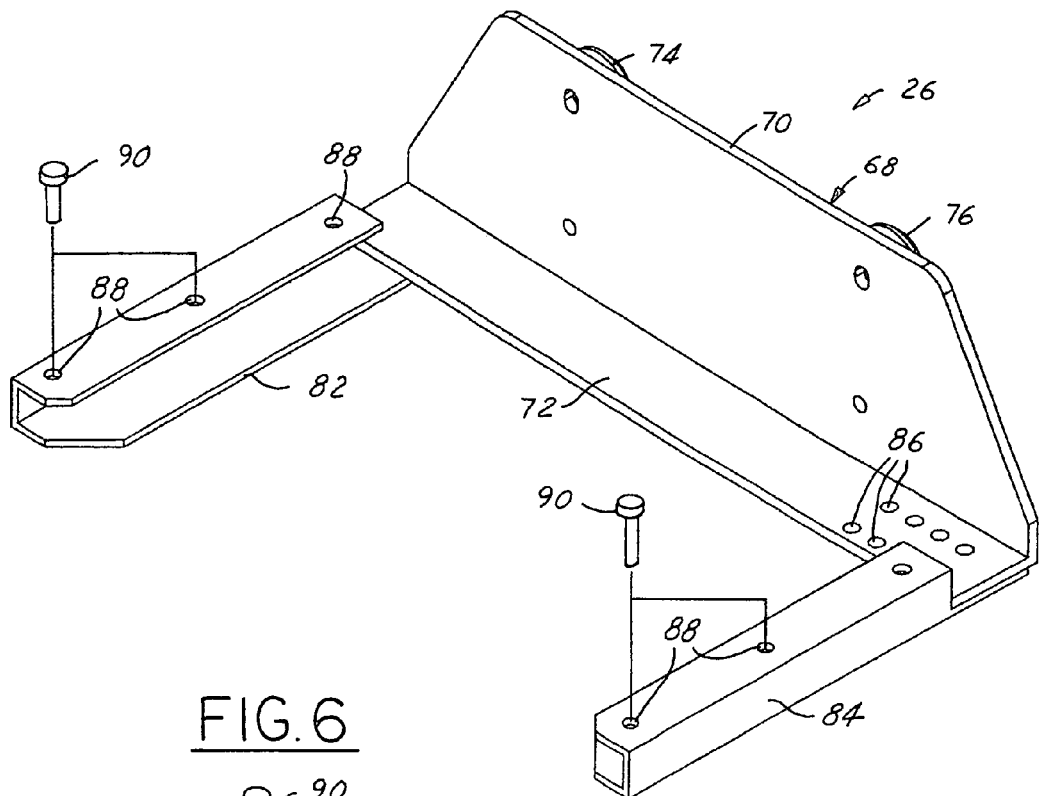
FIG. 6 is a front perspective view of the saw carriage in the table of FIGS. 1–4.
Figure 7:
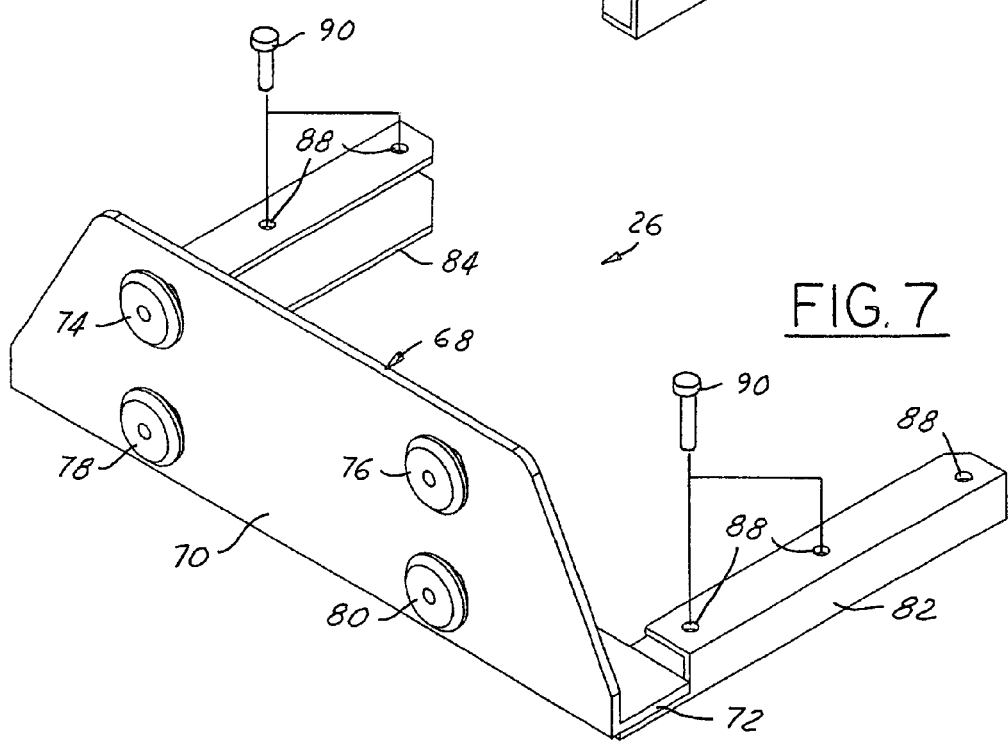
FIG. 7 is a rear perspective view of the carriage illustrated in FIG. 6.

FIGS. 6 and 7 illustrate details of saw carriage 26 in accordance with the illustrated exemplary but presently preferred embodiment of the invention. An L-shaped bracket 68 has a planar leg 70 and a foot 72. A first pair of rollers 74, 76 and a second pair of rollers 78, 80 are rotatably mounted on one side of leg 70. The axes of rotation of rollers 74, 76 are coplanar, and the axes of rotation of rollers 78, 80 are coplanar and parallel to the plane of the axes of rollers 74, 76. The roller pairs are vertically spaced from each other for receipt within opposed track channels 25, 27 of the C-shaped cross section of boom 24. Use of four rollers 74–80 is preferred for enhanced stability of the saw carriage. A pair of legs 82, 84 extend from bracket foot 72. Bracket foot 72 is provided with a plurality of leg mounting openings 86 for adjustably positioning at least one of the legs with respect to the other and with respect to bracket 68. Legs 82, 84 have internally threaded openings 88 for receiving thumb screws 90. Each leg 82, 84 preferably is provided with a number of openings 88. Carriage 26 is readily adjustable to mount circular saws of differing manufacturers and having differing saw shoe geometries.

As best seen in FIG. 3, rails 14, 16 preferably are sized to be telescopically received over the ends 92 of the support rails on a sheet bending brake 94, such that the sheet bending brake itself forms an extension of the saw table. This feature of the saw table eliminates the need for adjustable extensions from one or both ends of the table, as is typical in the prior art. A suitable sheet bending brake is illustrated in U.S. application Ser. No. 09/793,062 filed Feb. 26, 2001, the disclosure of which is incorporated herein by reference for purposes of background. The opposing end of saw table 10 is supported by a leg stand 96 telescopically received in the opposing ends of tubular rails 14, 16. As an alternative to mounting the saw table as an extension of a sheet bending brake, a second leg stand 98 may be employed, as illustrated in FIG. 3.

In use, sheet material to be cut is placed on platform 12, and a flat edge of the sheet material is brought into engagement with face 19 of abutment stop 18. Mast 22 and boom 24 are placed at the desired cut angle. Saw 28 is preassembled to carriage 26, and carriage 26 preferably is preassembled to boom 24. Saw 28 is turned on, and the saw blade is brought into engagement with the sheet material on the platform. Abutment stop 18 is provided with a gap 100 through which the saw blade may pass in cutting the sheet stock. Mast 24 is provided with removable pins (not shown) or other suitable means to prevent inadvertent removal of saw carriage 26.

There has thus been described a saw table that fully satisfies all of the objects and aims previously set forth. The invention has been described in connection with a presently preferred embodiment thereof, and a number of modifications and variations have been discussed. Other modifications and variations will readily suggest themselves to persons of ordinary skill in the art. The invention is intended to embrace all such modifications and variations as fall within the spirit and broad scope of the appended claims.

What is claimed is:

1. A saw table for sheet material, which includes:
    a platform having an abutment stop for engaging and locating sheet material supported on said platform,
    a mast disposed adjacent to said abutment stop and rotatable about an axis perpendicular to said platform,
    a boom extending from said mast over said platform, said boom having an elongated track perpendicular to said axis,
    a carriage carried by said boom for movement along said track,
    said carriage being for mounting a saw such that movement of said carriage along said track brings the saw into engagement with sheet material on said platform against said abutment stop,
    a lock for locking said mast and said boom at a desired angular orientation with respect to said abutment stop on said platform,
    a support underlying said platform, a first disk secured to said support and a second disk secured to said mast in facing engagement with said first disk, said lock selectively permitting rotation of said mast and said second disk with respect to said support and said first disk,
    said first and second disks having peripheries with indicia for indicating angular orientation of said boom with respect to said abutment stop,
    said lock being a cam lock that includes a cam arm releasably engaging an underside of said support, a threaded shank extending from said cam arm through apertures in said disks, and a nut secured to said shank overlying said second disk.

2. The saw table set forth in claim 1 wherein said platform is rectangular, with said abutment stop extending along one edge of said rectangular platform and the opposing edge of said platform being free of obstruction such that the sheet material may be placed on said platform from a direction perpendicular to said abutment stop.

3. The saw table set forth in claim 2 wherein said abutment stop has a gap for permitting passage of the saw, and wherein said mast is disposed adjacent to said gap.

4. The saw table set forth in claim 1 wherein said first and second disks have openings for alignment with each other at selected angles of said mast and said boom, and wherein said lock includes a pin insertable through said openings.

5. The saw table set forth in claim 1 wherein said boom is of C-shaped cross section having opposed internal channels extending along said boom, and forming said track and wherein said carriage includes rollers for disposition in said channels for supporting said carriage on said boom.

6. The saw table set forth in claim 5 wherein said carriage is adjustable for selectively mounting saw shoes of differing configurations.

7. The saw table set forth in claim 1 wherein said platform is mounted on spaced rails that are adapted to be telescopically received over spaced rails on a sheet bending brake such that the sheet bending brake forms an extension of said platform.

8. A saw table for sheet material, which includes:
    a platform having an abutment stop along one edge for engaging and locating sheet material supported by said platform, an opposing edge of said platform being free of obstruction such that the sheet stock may be placed on said platform from a direction perpendicular to said abutment stop,
    a mast disposed adjacent to said one edge external to said abutment stop and rotatable about an axis perpendicular to said platform,
    indicia for indicating angular orientation of said mast about said axis,
    a lock for locking said mast at a desired angular orientation about said axis,
    a boom cantilevered from said mast over said platform, said boom having an elongated track perpendicular to said axis,
    a carriage carried by said boom for movement along said track,
    said carriage being for mounting a circular saw such that movement of said carriage along said track brings the saw into engagement with sheet material on said platform, and
    a support underlying said platform, a first disk secured to said support and a second disk secured to said mast in facing engagement with said first disk, said indicia being disposed on said first and second disks, said lock selectively permitting rotation of said mast and said second disk with respect to said support and said first disk,
    said lock being a cam lock that includes a cam arm releasably engaging an underside of said support, a threaded shank extending from said cam arm through apertures in said disks, and a nut secured to said threaded shank overlying said second disk.

9. The saw table set forth in claim 8 wherein said first and second disks have openings for alignment with each other at selected angles of said mast and said boom, and wherein said lock includes a pin insertable through said openings.

10. The saw table set forth in claim 8 wherein said boom is of C-shaped cross section having opposed internal channels extending along said boom, and forming said track and wherein said carriage includes rollers for disposition in said channels for supporting said carriage on said boom.

11. The saw table set forth in claim 10 wherein said carriage is adjustable for selectively mounting saw shoes of differing configurations.

12. The saw table set forth in claim 8 wherein said platform is mounted on spaced rails that are adapted to be telescopically received over spaced rails on a sheet bending brake such that the sheet bending brake forms an extension of said platform.

13. Apparatus for mounting to a platform to form a saw table, which includes:
 a mast for mounting adjacent to the platform for rotation about an axis perpendicular to the platform,
 a boom extending from said mast for positioning over the platform, said boom having an elongated track perpendicular to said axis,
 a carriage carried by said boom for movement along said track, and for mounting a saw such that movement of said carriage along said track brings the saw into engagement with sheet material on the platform,
 a lock for locking said mast and said boom at a desired angular orientation with respect to said axis, and
 a support for underlying the platform, a first disk secured to said support and a second disk secured to said mast for facing engagement with said first disk, said lock selectively permitting rotation of said mast and said second disk with respect to said support and said first disk,
 said first and second disks have peripheries with indicia for indicating angular orientation of said boom about said axis,
 said lock being a cam lock that includes a cam arm releasably engaging an underside of said support, a threaded shank extending from said cam arm through apertures in said disks, and a nut secured to said shank overlying said second disk.

14. The apparatus set forth in claim 13 wherein said first and second disks have openings for alignment with each other at selected angles of said mast and said boom, and wherein said lock includes a pin insertable through said openings.

15. The apparatus set forth in claim 13 wherein said boom is of C-shaped cross section having opposed internal channels extending along said boom, and forming said track and wherein said carriage includes rollers for disposition in said channels for supporting said carriage on said boom.

16. The apparatus set forth in claim 15 wherein said carriage is adjustable for selectively mounting saw shoes of differing configurations.

17. The apparatus set forth in claim 13 further including an abutment stop for mounting along one edge of the platform to engage and locate sheet material supported by the platform, said mast being adapted to be located adjacent to said abutment stop on the platform.

\* \* \* \* \*